Figure 1:
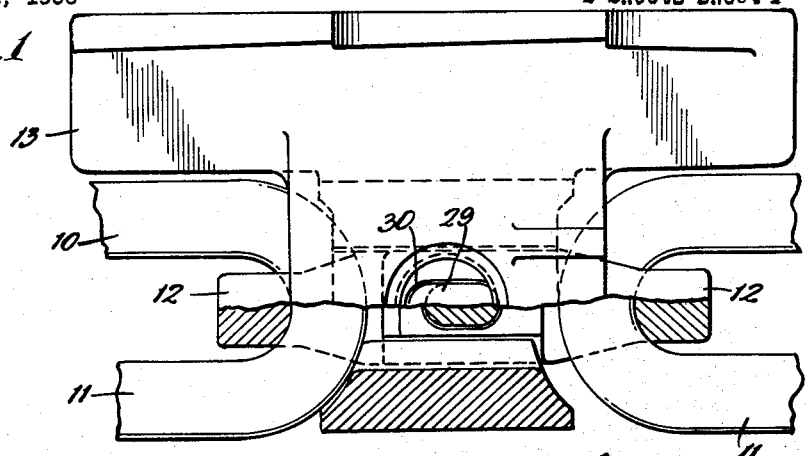

Oct. 27, 1959 G. R. DODSON 2,910,170
FLIGHT FIXTURE ASSEMBLY
Filed Oct. 2, 1956 2 Sheets-Sheet 1

INVENTOR:
Guy R. Dodson,
BY Dawson, Tilton + Graham,
ATTORNEYS.

Oct. 27, 1959  G. R. DODSON  2,910,170
FLIGHT FIXTURE ASSEMBLY
Filed Oct. 2, 1956  2 Sheets-Sheet 2
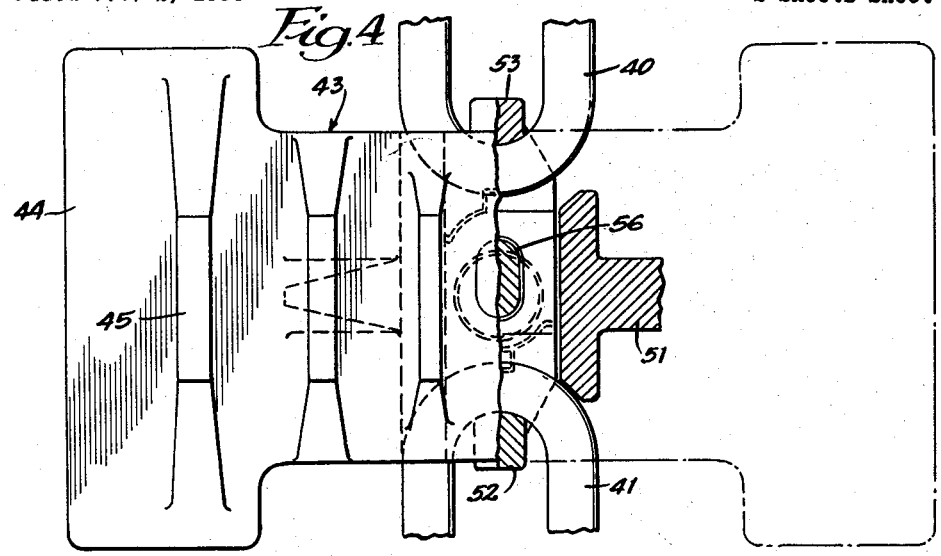
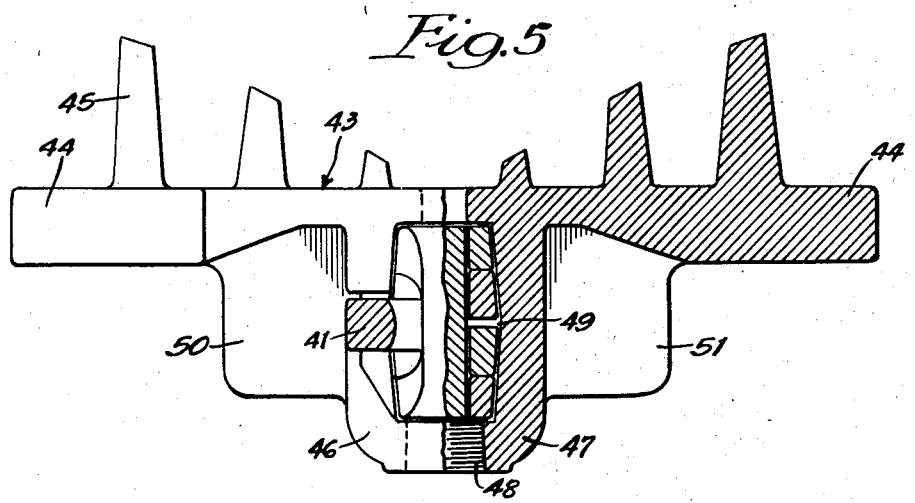
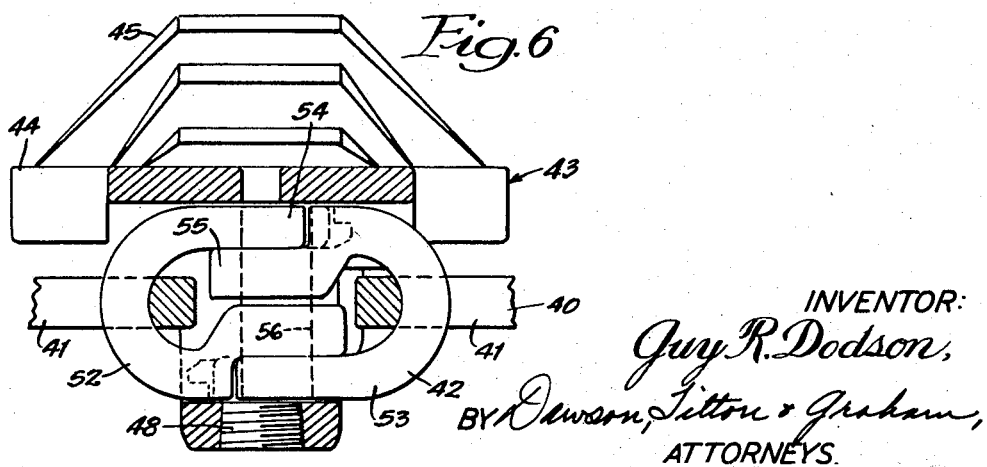
INVENTOR:
Guy R. Dodson,
BY Dawson, Tilton & Graham,
ATTORNEYS.

United States Patent Office 2,910,170
Patented Oct. 27, 1959

2,910,170

FLIGHT FIXTURE ASSEMBLY

Guy R. Dodson, Beaverton, Oreg., assignor to Electric Steel Foundry Company, Portland, Oreg., a corporation of Oregon Application October 2, 1956, Serial No. 613,546

4 Claims. (Cl. 198—200)

This invention relates to a flight fixture assembly, and more especially to a flight fixture or log haul chair which may be detachably mounted on a conveyor chain for moving logs or other materials along a predetermined path by engagement of the flight fixture with such materials as the conveyor chain is advanced.

Flight fixture assemblies of the general type herein considered are well known in the art, as is shown by Ehmann Patent No. 2,294,080. These assemblies comprise an endless conveyor chain that may be formed of interconnected links, certain of which are of special construction and are adapted to have the flight fixtures secured thereto. An important object of this invention is to provide an improvement in flight fixture assemblies of this general type.

Another object of the invention is in the provision of a flight fixture assembly wherein all of the gross cross section of the mounting links for the flight fixture is used for strength rather than for driving the load, as in the case with prior art structures employing saddle links in a rectangular link box. A still further object is to provide a structure in which the flight fixture is carried by the link assembly but is transported between adjacent chain links, thus enabling a shorter chain pitch to be employed.

A further object is to provide a flight fixture or log haul chair assembly, including a detachable fixture and mounting link therefor, comprising a pair of mating U-shaped link sections, and in which the outer leg or pad of one link section and the inner pad of its mate occupy a confined space within the fixture, and the corresponding inner and outer pads of the link sections being in part exterior of the fixture whereby the fit of the link sections is not affected by variations in the width of the link sections. Yet another object of the invention is to provide a mounting link and fixture as described above, wherein the placement of the pin for securing the link sections together is dependent only on the fit of the link sections in relation to each other and not on the fit of the link sections with the fixture.

Yet a further object is to provide a structure as described in which the fixture straddles the connecting or mounting link, and is retained in place with respect thereto by longitudinal ribs provided by the fixture and which extend into slots provided therefor between the upper and lower portions of the mating link sections. Additional objects and advantages will appear as the specification is developed.

Embodiments of the invention are illustrated in the accompanying drawings, in which—

Figure 2:
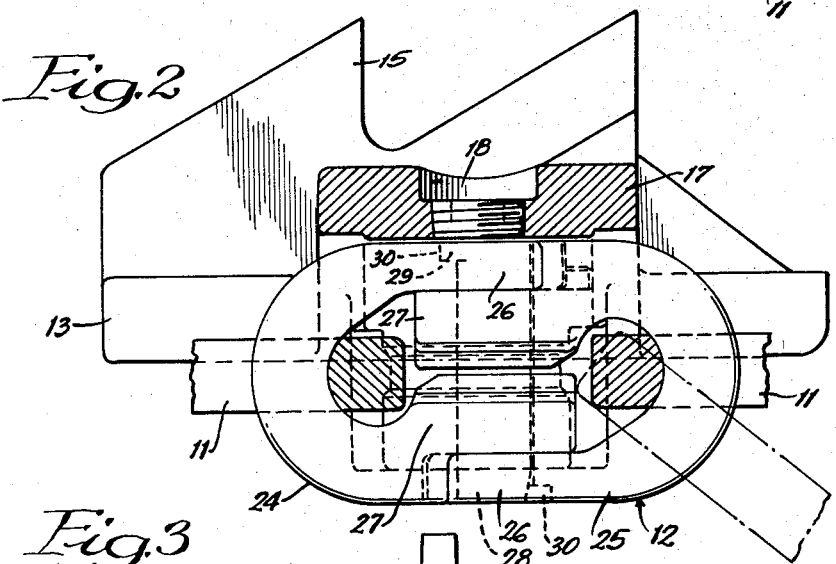
Figure 3:
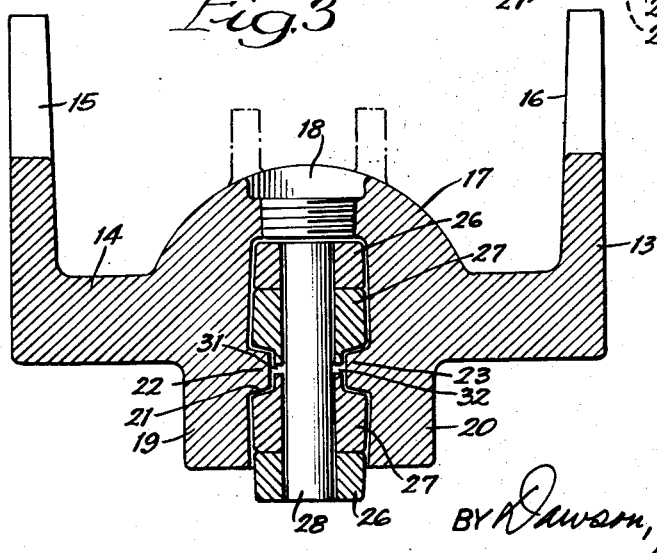

Figure 1 is a broken half top plan view and half horizontal sectional view of a flight fixture assembly embodying the invention; Figure 2 is a longitudinal sectional view of the assembly shown in Figure 1, and taken substantially along the center line thereof; Figure 3 is a vertical sectional view of the assembly shown in Figure 2, and taken substantially along the vertical axis thereof; Figure 4 is a top plan view partly in horizontal section of a modified form of the invention; Figure 5 is an end view partly in elevation and partly in section of the modification shown in Figure 4; and Figure 6 is a longitudinal sectional view of the modification shown in Figures 4 and 5.

A conveyor chain adapted to have a flight fixture mounted thereon is shown in Figures 1 and 2, and is designated generally with the numeral 10. The chain 10 comprises a plurality of interconnected chain links 11 and interspersed between certain of the links 11 is a mounting or support link 12. Each link 12 is adapted to have a flight fixture 13 mounted thereon. As viewed in Figures 1 and 2, the conveyor chain 10 is adapted to move from the left toward the right, and as it moves it advances the fixture 13 carried thereby in the same direction.

As is most apparent from Figure 3, the flight fixture 13 in the particular form shown, is generally U-shaped, having a base 14 and walls 15 and 16 rising from the base. Centrally, the base 14 between the vertical walls 15 and 16 has a rounded boss 17 provided with a tapped opening 18 therein adapted to threadedly receive a plug for closing the opening. Spaced legs 19 and 20 depend from the base 14 generally along opposite sides of the opening 18, and define a channel or passage 21 therebetween. As is most apparent from Figures 1 and 2, the legs 19 and 20 are provided, respectively, with inwardly-extending ribs 22 and 23 that restrict the passage 21.

The mounting link 12 comprises a pair of identical link sections or hooks 24 and 25, and since they are identical, each has an outer leg 26 and an inner leg 27. The sections 24 and 25 when reversely aligned, as shown best in Figures 2 and 3, are adapted to be telescoped together with the outer legs 26 confining the inner legs therebetween.

The legs or pads 26 and 27 have aligned openings therethrough adapted to receive a pin 28 that is provided with an enlarged head 29 that nests within a corresponding opening 30 in the outer pad or leg 26 of the link section 24, and which prevents the pin from being pushed completely through the aligned openings in the various legs. It is clear from Figure 2 that the outer leg 26 of the link section 25 has a corresponding opening 30 therein so that were it along the upper side thereof, it would receive the head 29 of the pin therein. The inner pads or legs 27 have recesses 31 and 32, respectively, along the opposite sides thereof for receiving the ribs or tongues 22 and 23 of the flight fixture 13. The slots or recesses permit longitudinal movement of the fixture 13 with respect to the mounting link 12, but constrains the fixture against transverse movements with respect thereto.

In assembling the apparatus, the link sections 24 and 25 are threaded through the chain links 11, as shown in Figures 1 and 2, and are then inserted in longitudinal movements into the channel 21 defined in the flight fixture so as to telescope the inner and outer legs, as shown in Figure 2.

Thereafter, the pin may be inserted through the legs by moving it downwardly through the threaded opening 18 in the fixture. The enlarged head 29 of the pin seats within the corresponding opening 30 in the pad 26, whereby continued downward movement of the pin is prevented. Thereafter, a plug (not shown) may be threaded into the opening or bore 18 in the flight fixture to lock the pin 28 in place.

It will be apparent that the ribs 22 and 23 received within the slots 31 and 32 therefor prevent upward or downward movement of the flight fixture with respect to the mounting link 12, as viewed in Figure 3. The fixture, however, is free to move longitudinally with respect to the mounting link, and in use will move toward the left, as viewed in Figure 1, until it abuts the link 11 along the rear edge thereof. It is evident that the apparatus may be disassembled in a like manner simply by reversing the steps recited above.

It is clear that the flight fixture 13 is driven because of the engagement thereof with the link 11 whereby all of the metal of the mounting link 12 is utilized for strength rather than for driving the flight fixture and its load. It is noted particularly in Figure 3 that the lowermost arms 26 and 27 could be spaced a greater distance from the upper arms 26 and 27 whereby the link sections 24 and 25 would be opened to a greater extent, and no complications would result in the assembly of the mounting link and flight fixture, for the lower arms are in actuality free of the dimensional limits of the flight fixture.

The modified structure shown in Figures 4 through 6 is basically the same in construction as the apparatus illustrated in Figures 1 through 3. The modification shows the feasibility of using the general type of construction already described with a four inch pitch as compared with a six inch pitch, which has been considered heretofore the minimum pitch for saddle links. Referring first to Figure 6, it is seen that a conveyor chain 40 is provided comprising a plurality of regular chain links 41 and one or more mounting or support links 42 interposed therebetween at predetermined points therealong. Mounted on the link 42 is a flight fixture 43.

The fixture 43, as is most clear from Figure 5, comprises a base 44 having a plurality of spaced-apart walls or cleats 45 extending upwardly therefrom. Depending from the base 44 are legs 46 and 47 that merge at their lower end and are provided with a threaded bore 48 therein communicating with an enlarged chamber 49 defined between the legs. If desired, reinforcing webs 50 and 51 may be formed integrally with the legs and with the base 44.

The mounting link 42 comprises a pair of link sections or hooks 52 and 53 that are identical, having outer legs 54 and inner legs 55. These legs have aligned openings therethrough that receive the securing pin 56 therein having an offset head, as described in connection with the pin 28 which seats within a corresponding recess in the outer legs. A plug may be threaded into the bore 48 to prevent inadvertent removal of the pin 56.

As heretofore set out, the flight fixture in the present structure is carried by the link assembly but is transported or driven by the adjacent chain links. This means that for any given size of chair attachment, a shorter pitch pin may be used than would be required for the saddle links of the prior art or practice. For example, in a 4" pitch chain employed with the present structure, the flight application would require at least 6" pitch with the prior saddle links. It is an important advantage in operation to be able to use a shorter chain pitch with the flight fixture employed.

The construction, as has been brought out hereinbefore, is substantially identical to that heretofore described and its function is similar. Therefore, a further discussion of the modification setting forth the details thereof in greater particularity is believed unnecessary.

While, in the foregoing specification, embodiments of the invention have been set forth in considerable detail for purposes of making an adequate disclosure thereof, it will be apparent to those skilled in the art that numerous changes may be made in those details without departing from the spirit and principles of the invention.

I claim:

1. In a flight equipped chain, a conveyor chain having a plurality of links, one of said links being a mounting link, said mounting link comprising a pair of substantially identical link sections each having an outer leg and an inner leg, said link sections being reversely oriented and telescoped together with the relatively thin outer legs confining the relatively thick inner legs therebetween and providing a relatively smooth outer contour, said legs having aligned openings therein, a pin within said opening to secure said link sections together, and a flight fixture longitudinally movably mounted on said mounting link whereby it is advanced by a link of said conveyor chain adjacent said mounting link, said fixture having spaced apart depending leg members between which said mounting link is received, said leg members being equipped with means for preventing removal of said mounting link from between said leg members.

2. The structure of claim 1 in which said pin is equipped with an offset head, the outer leg of said mounting link adjacent said flight fixture being equipped with a corresponding recess in which said head is received, the said flight fixture being equipped with a threaded bore alignable with said pin to permit ready insertion and removal thereof from said legs, and a plug threadably mounted in said threaded bore for confining said pin in position within the aligned openings within said legs.

3. In a flight fixture assembly, a conveyor chain having a plurality of links, one of said links being a mounting link, said mounting link comprising a pair of substantially identical link sections each having an outer leg and an inner leg, said link sections being longitudinally and reversely oriented and telescoped together with the outer legs confining the inner legs therebetween, said outer legs being of uniform cross section throughout the longitudinal portion thereof, said legs having aligned openings therein, a pin within said openings to secure said link sections together, a flight fixture having a pair of depending legs receiving said mounting link therebetween, said mounting link being longitudinally movable within said pair of legs but restricted against transverse movement therein, said depending pair of legs being engageable by one of the links of said chain adjacent said mounting link for advancing said flight fixture as said chain moves, and means on said pair of legs preventing removal of said mounting link from between said pair of legs.

4. The structure of claim 3 in which said pair of depending legs merge at their lower ends to provide said means for preventing removal of said mounting link from between said pair of legs.

References Cited in the file of this patent

UNITED STATES PATENTS

| 2,278,853 | Hudson | Apr. 7, 1942 |
| 2,294,080 | Ehmann | Aug. 25, 1942 |
| 2,570,583 | Miller | Oct. 9, 1951 |
| 2,614,685 | Miller | Oct. 21, 1952 |
| 2,780,830 | Kammerer | Feb. 12, 1957 |
| 2,799,388 | Wilson | July 16, 1957 |